Patented Apr. 11, 1944

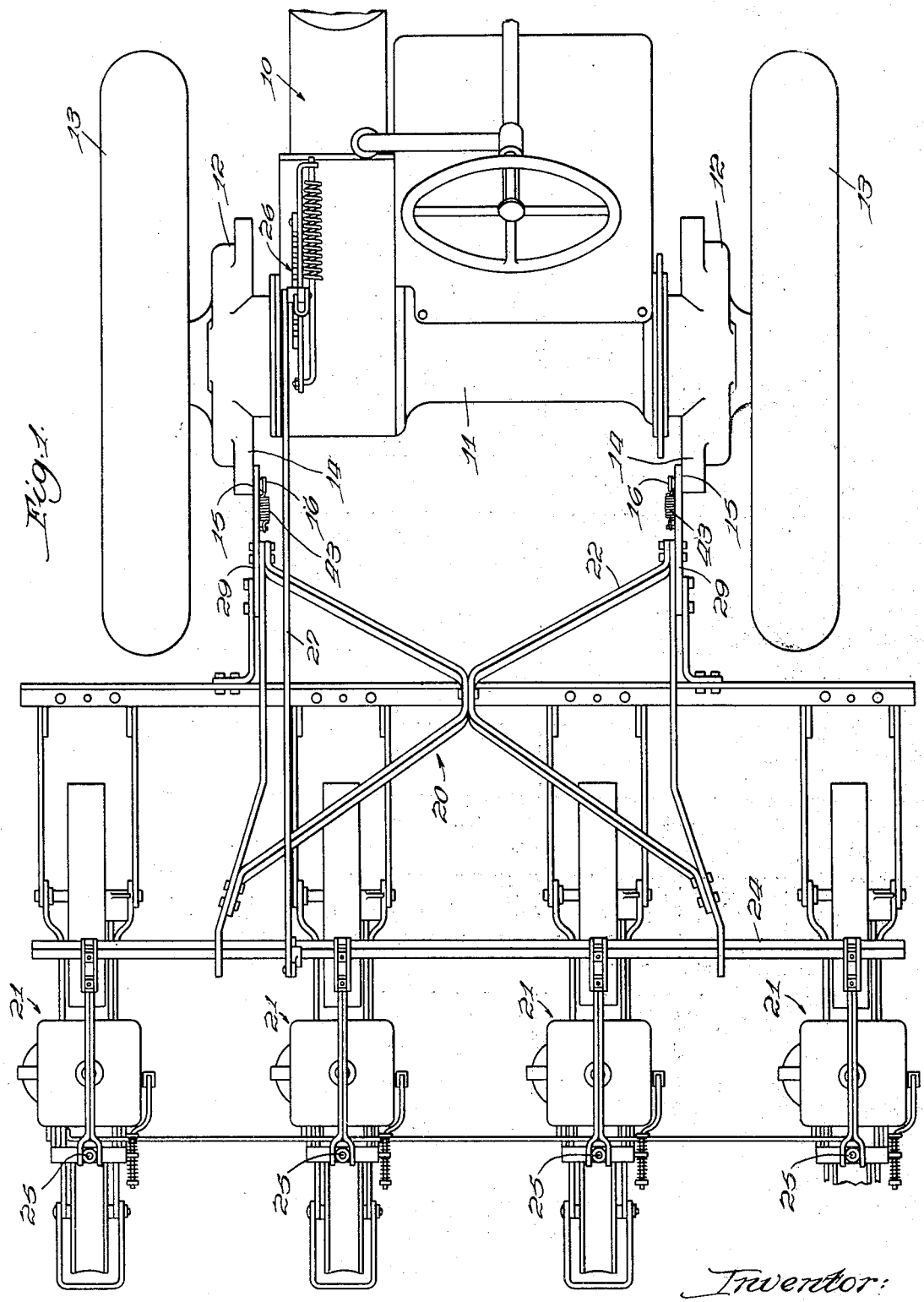

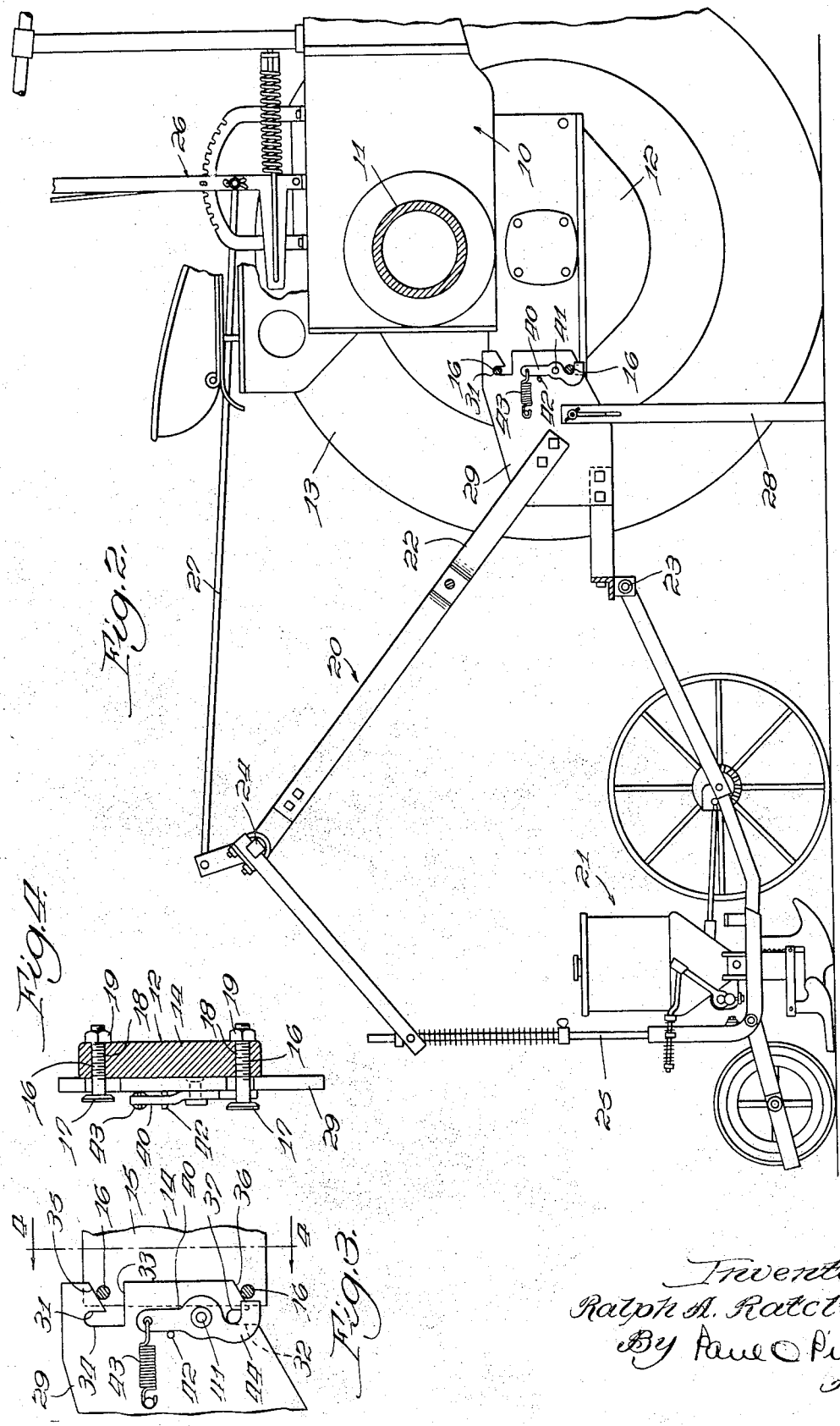

2,346,330

UNITED STATES PATENT OFFICE 2,346,330

TRACTOR-MOUNTED IMPLEMENT

Ralph A. Ratcliff, Canton, Ill., assignor to International Harvester Company, a corporation of New Jersey Application January 15, 1942, Serial No. 426,793

7 Claims. (Cl. 111—52)

This invention relates to tractor-mounted implements and more particularly to quick attachable means for the connecting of these implements to tractors or their tool-supporting structures.

It is an object of the present invention to provide an improved quick attachable means for the connecting of working-tool structures with their tool-supporting structure, wherein the connection can be made automatically upon uniting the two structures together and wherein the quick attachable means is thereby self-locking.

According to the present invention, attaching portions are provided on the tractor or tool-supporting structure which are laterally spaced and vertically extending. The implement or working-tool structure is likewise provided with similar laterally spaced and vertically extending attaching portions adapted to cooperate with the attaching portions of the tool-supporting structure. The attaching portions of one of the structures are provided with vertically spaced, laterally extending projections, while the attaching portions of the other structure are provided with vertically spaced open-ended slots with vertically extending portions adapted to receive the transversely extending projections of the attaching portions of the one structure. Since the projections are finally centered within the vertically extending portions of the slot, the attaching portions with the slots are so arranged that longitudinal draft may be taken through these attaching portions or plates. Associated with each attaching portion is means for locking the attaching portions against vertical displacement with respect to each other to thereby maintain the laterally extending projections within the vertically extending portions of the slot. This locking means functions automatically upon the attaching portions being alined with respect to each other as when the union of the same is made.

For a better understanding of the invention, reference may be had to the following detailed description taken in connection with the accompanying drawings, in which:

Figure 1 is a plan view of the rear portion of a tractor or tool-supporting structure and of an implement attached thereto;

Figure 2 is a sectional view in elevation of the tractor with one of its rear wheels removed and of the implement connected to the tractor with the attaching means embodying the features of the present invention;

Figure 3 is a detail view of the attachable means just prior to the locking of the projections within the vertical extending portions of the slot; and Figure 4 is a detail view partly in section and taken along the line 4—4 of Figure 3.

Referring now particularly to Figures 1 and 2, there is shown a tractor 10 having a rear axle structure 11 with depending axle housings 12. The rear portion of the tractor is supported by rear traction wheels 13. On each of the depending axle housings, there is provided attaching portions 14. It will be noted that these attaching portions are laterally spaced with respect to each other and extend vertically to provide vertically extending face portions 15. These face portions face each other and extending from each of the same is a pair of vertically spaced laterally extending projections 16. Referring particularly to Figure 4, it will be noted that these projections take the form of bolts having head portions 17 and threaded portions 18 on which is threaded a nut 19. By adjusting the nut 19, the head portion 17 can extend a more or less distance from the face 15 of the attaching portion 14.

Adapted for connection to the tractor is a working-tool structure, indicated generally at 20. This working-tool structure happens to be that of a vegetable planter having individual planting units 21 connected respectively to a hitching structure 22, as indicated at 23. On the upper end of the hitch structure 22 is a rockable structure 24 which is connected to the individual planting units 21 by means of the lifting links 25. This rockable structure 24 is adapted to be rocked by a manually adjustable mechanism 26 located on the tractor 10 and connected to the rockable structure 24 by means of a rod 27. As the adjustable mechanism 26 is operated to cause forward movement of the connecting rod 27, the rockable structure 24 will be rotated in a clockwise direction thereby lifting the planting units to a transport position about their respective pivotal connections 23 with the hitch structure 22. When the planter is disconnected from the tractor, the hitch structure will be supported upon pedestals 28 adjustably connected to the hitch structure to maintain the same at the proper height for connection with the attaching portions 14 of the tractor.

Coming now more particularly to the specific feature of the invention, there is provided on the working-tool structure and forming a part of a hitch structure, a pair of laterally spaced, vertically extending plates or attaching portions 29. These plates 29 are spaced relative to each other so that the respective outer faces of the same may be alined with the faces 15 of the attaching portions 14 of the tractor.

Each of the plates 29 has a pair of vertically spaced open-ended slots 31 and 32. The slot 31 has a horizontally extending portion 33 and a vertically extended portion 34. Provided on the horizontally extending portion 33 is an inclined portion 35 serving to guide the upper projection 16 into the vertically extending portion 34 of the slot 31 where it will be finally retained. The projections 16 are adjusted so that the head of the bolt 17 will provide enough space to receive the width of the plate 29. The head 17 will thereby cooperate with the plate 29 to provide against lateral displacement thereof with respect to attaching portion 14.

Associated with the lower slot 32 is provided an inclined guiding portion 36 serving to guide the lower projection 16 into a vertically extending portion 37 of the slot 32. It should now be apparent that as the union is made of the attaching portions 14 of the tractor with the plates 29, the inclined portions 35 and 36 will respectively guide the projections 16 into the vertically extending portions 34 and 37 of the slots 31 and 32. Once these projections are seated within the vertically extending portions of the slot, in the manner shown best in Figure 2, a longitudinal draft from the tractor can be taken directly through the plates 29.

As a means for locking the projection 16 within the slots, there is provided on each of the plates 29 a latching device 40. This latching device takes the form of a lever 41 pivoted at 41 and normally maintained against a stop 42 by means of a tension spring 43. As the union of the attaching portions is about to be made, see Figure 3, the lower projection 16 will abut a hook portion 44 on the lever 40 and cause rotation of the lever 40 in a clockwise direction against the action of the spring 43 until the projection 16 is in alinement with the vertically extending portion 37 of the slot 32, whereupon the plate 29 will be dropped down so that the hook portion 44 surrounds the lower projection 16. By this means the plates 29 will be retained against vertical displacement with respect to the attaching portions 14 of the tractor. It should now be apparent that this locking of the plates 29 with the attaching portions 14 is entirely automatic. When it is desired to unlock the working-tool structure from the tractor, it becomes only necessary to operate the lever 40 by manually holding it against the action of the spring 43 and raising the plates 29 so that the projection 16 would be released from the vertically extending portions of the slot. Forward movement of the tractor would then leave the working-tool structure free of the same and retained on the pedestals 28.

It should be noted that the head portion 17 of the lower projection 16 is adjusted to have a greater distance from the face 15 of the attaching portion 14. This is done by the adjustment of the nut 19 and so that the hook portion 44 as well as the plate 29 of the lever may be received between the head 17 and the face 15 of the attaching portion 14.

It should now be apparent that there has been provided an improved attaching means for the connection of direct-connected implements to a tractor or tool-supporting structure, wherein the attachment is made automatically upon alinement of the respective attaching portions of the implement and tractor structures. The object to make direct-connected implements more quickly attachable to tractors has thereby been accomplished.

While various changes may be made in the detail construction, it shall be understood that such changes shall be within the spirit and scope of the present invention as defined by the appended claims.

What is claimed is:

1. In combination, a tool-supporting structure having laterally spaced vertically extending attaching portions, vertically spaced laterally extending projections carried by each of the attaching portions, a working-tool structure having laterally spaced vertically extending plates adapted to engage respectively with the attaching portions of the tool-supporting structure, each of said plates having open-ended slots arranged to receive respectively the laterally extending projections of the tool-supporting structure attaching portions, and means associated with each of said plates for automatically locking the projections within said slots upon insertion of said projections therein.

2. In combination, a tool-supporting structure having laterally spaced vertically extending attaching portions, a laterally extending projection carried on each attaching portion, a working-tool structure having laterally spaced vertically extending plates adapted to engage respectively the attaching portions of the tool-supporting structure, each of said plates having an open-ended slot with horizontally and vertically extending portions for receiving respectively a projection, the horizontally extending portion of each slot being the first portion to receive its respective projection upon the plates being vertically alined with attaching portions, the projections finally being received within the vertically extending portion of the respective slot whereby longitudinal draft may be taken through said plates and means associated with each of said plates and adapted to function automatically upon attachment of the tool structure to the tool-supporting structure for locking the plates against vertical displacement with respect to the tool-supporting structure.

3. In combination, a tool-supporting structure having laterally spaced vertically extending attaching portions, vertically spaced laterally extending projections carried by each of the attaching portions, a working-tool structure having laterally spaced vertically extending plates adapted to engage respectively with the attaching portions of the tool-supporting structure, said plates having a pair of vertically spaced open-ended slots with vertically extending portions for respectively finally receiving said vertically spaced laterally extending projections, each of said slots having guiding portions for directing the projections into the vertically extending portions upon the working-tool structure being connected to the tool-supporting structure, the projections being finally located in the vertically extending portions of the slots whereby longitudinal draft may be taken through said plates, and means associated with each of said plates for locking the plates against vertical displacement with respect to said projections.

4. In combination, a tractor having laterally spaced vertically extending attaching portions, vertically spaced laterally extending projections carried by each of the attaching portions, a working-tool structure adapted to be directly connected to the tractor to be carried by the same and having laterally spaced vertically extending plates, said plates having vertically spaced slots with vertically extending portions for respectively finally receiving said projections upon the working tool being connected to the tractor, whereby longitudinal draft may be taken through said plates, and means associated with each of said plates for automatically locking the same against vertical displacement with respect to said projections upon insertion of said projections in said slots.

5. In combination, a tool-supporting structure having laterally spaced vertically extending attaching portions, a working-tool structure having similarly laterally spaced attaching portions, laterally extending projections carried respectively by the attaching portions of one of said structures, a vertically extending slot in each of the attaching portions of the other of said structures adapted to receive and retain respectively said laterally extending projections, and means for automatically locking the attaching portions against vertical displacement with respect to each other upon insertion of said projections in said slots.

6. In combination, a tool-supporting structure having laterally spaced vertically extending attaching portions, a working-tool structure having similarly laterally spaced attaching portions, a pair of vertically spaced laterally extending projections carried respectively by the attaching portions of one of said structures, a pair of vertically open-ended slots with vertically extending portions of the other of said structures and adapted to receive respectively and finally retain said laterally extending projections within the vertically extending portions of the slots, and means for automatically locking the attaching portions against vertical displacement with respect to each other upon insertion of said projections in said slots.

7. In combination, a tool-supporting structure having a vertically extending attaching portion, laterally extending projections carried by the attaching portion, a working-tool structure having a vertically extending plate adapted to engage with the attaching portion of the tool-supporting structure, said plate having open-ended slots arranged to receive respectively the laterally extending projections of the tool-supporting structure attaching portion, and means associated with each of said plates for automatically locking the projections within said slots upon insertion of said projections therein.

RALPH A. RATCLIFF.